ISAAC PALMER JONES,
DANIEL A. McCARTAN,
JARED R. KIES &
MERRITT W. SEYMOUR
*INVENTORS*

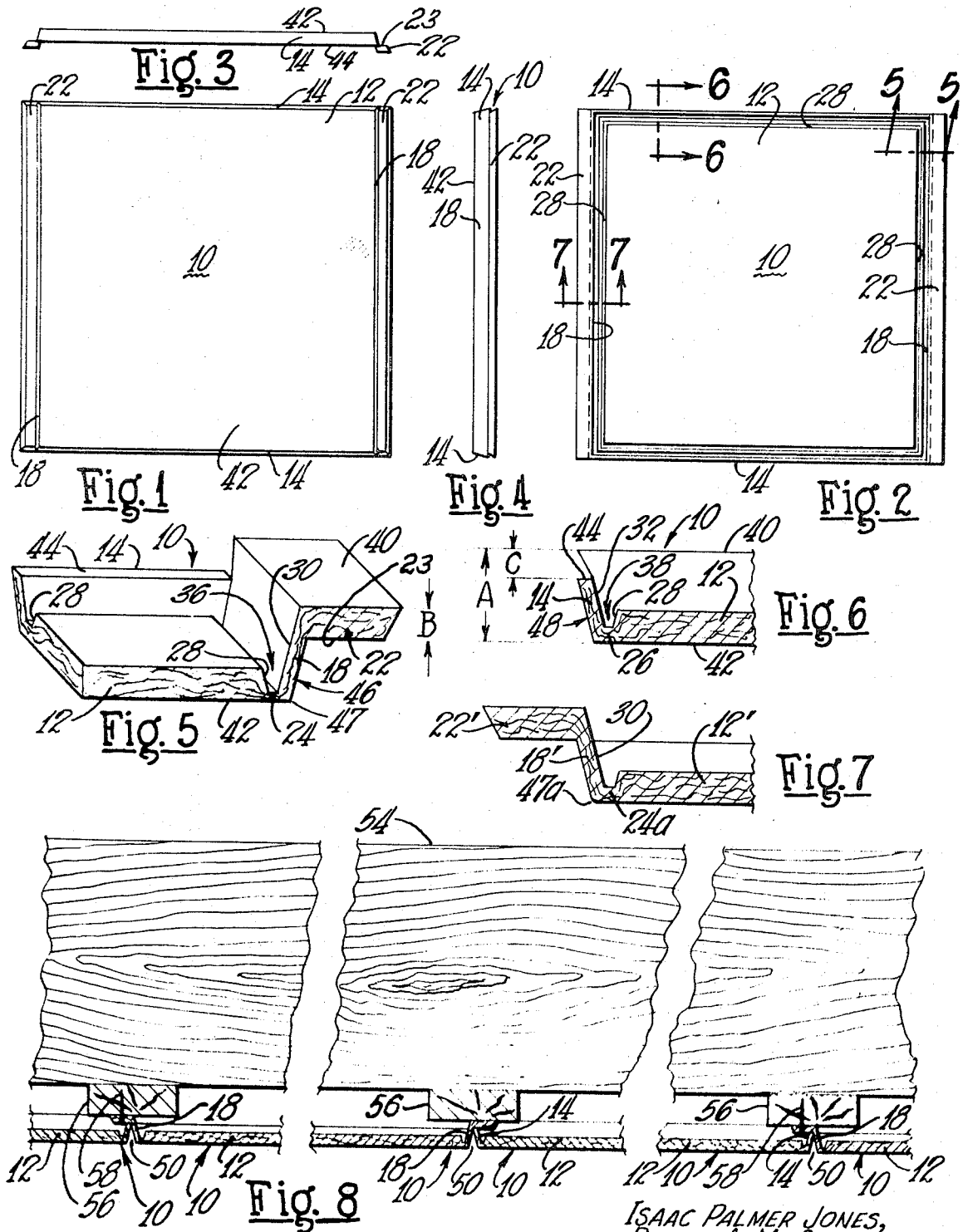

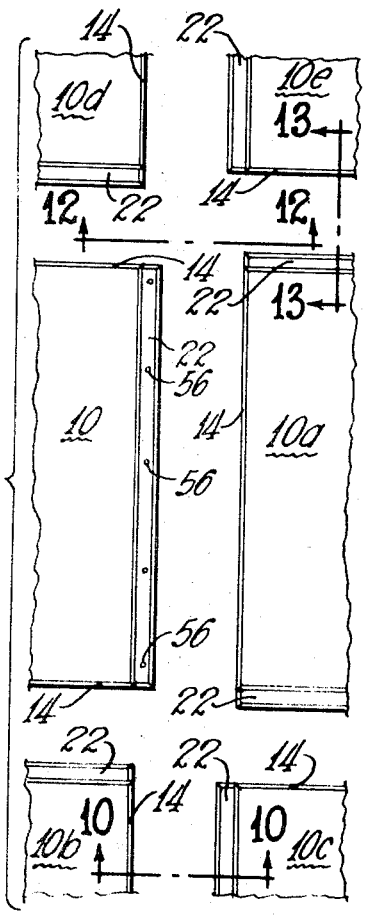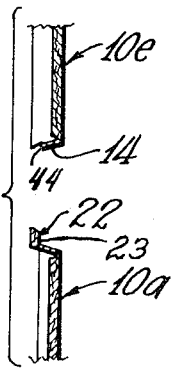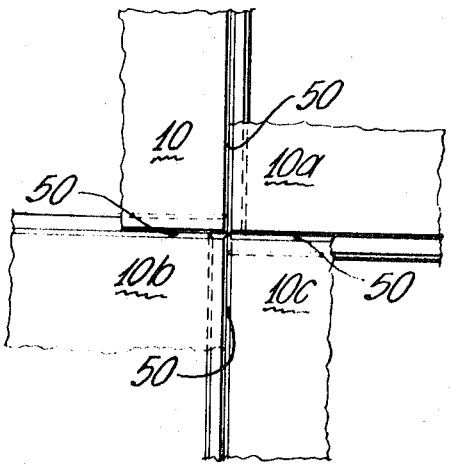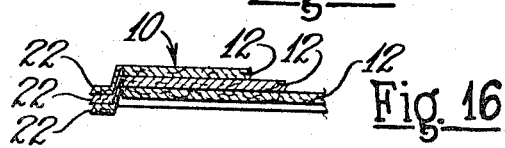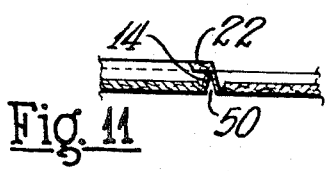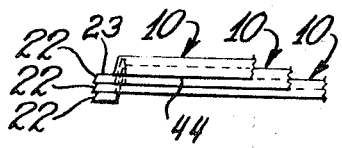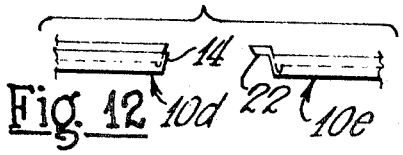

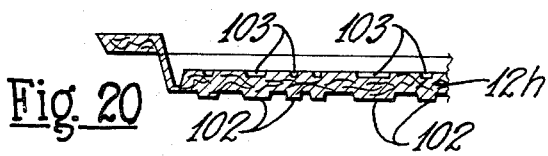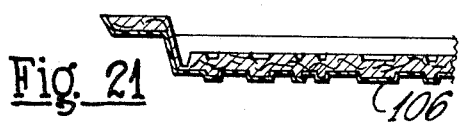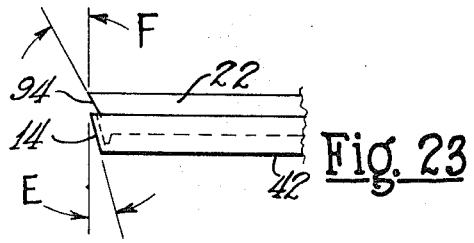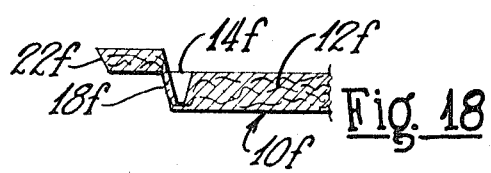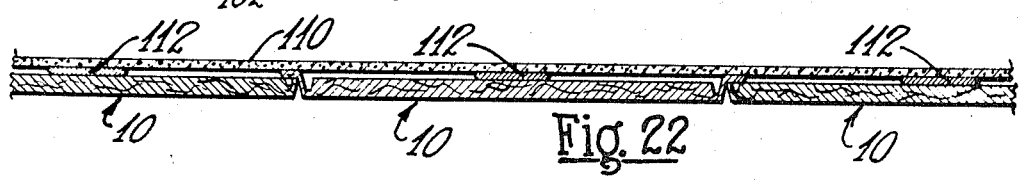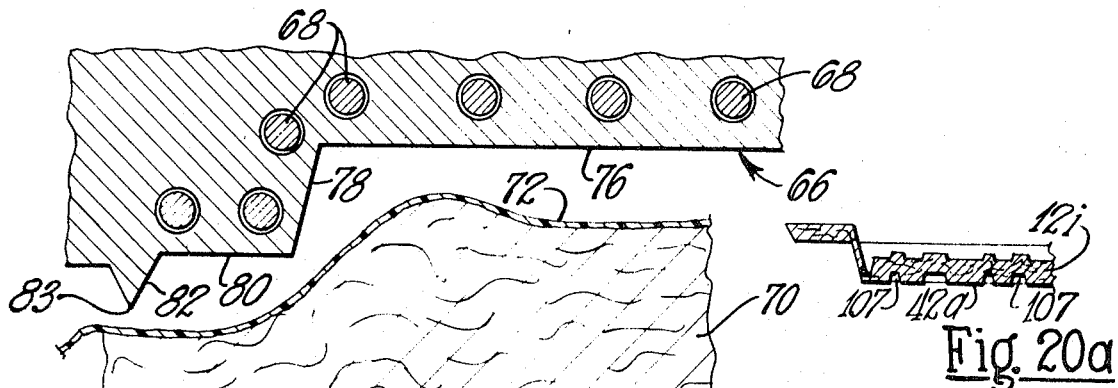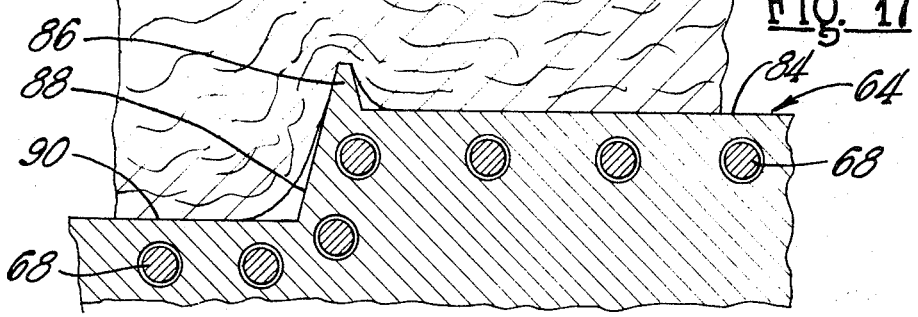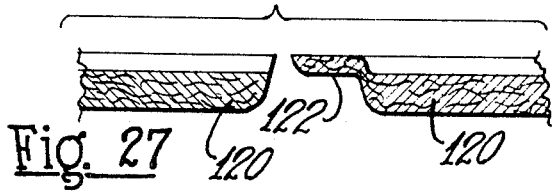

BY *Staelin & Overman*
ATTORNEYS

3,608,264
MOLDED FIBROUS SURFACING UNIT

Isaac Palmer Jones, Granville, Daniel A. McCartan, and Jared R. Kies, Newark, and Merritt W. Seymour, Toledo, Ohio, assignors to Owens-Corning Fiberglas Corporation
Continuation of application Ser. No. 661,914, Aug. 21, 1967. This application Sept. 4, 1969, Ser. No. 856,900
Int. Cl. E04b *5/54;* E04c *2/10;* E04f *13/16*
U.S. Cl. 52—593                    14 Claims

ABSTRACT OF THE DISCLOSURE

This invention embraces a molded fibrous surfacing unit, tile or panel and method of producing same wherein a mass of fibers, such as glass fibers, impregnated with a binder is compressed and shaped during the compressing operation to provide configurations for interengagement with adjacent units in assembly, the configurations being of a character providing alignment of the units in assembly and facilitating the securing of the units to a support means.

---

This application is a continuation of application Ser. No. 661,914, filed Aug. 21, 1967, now abandoned.

The invention pertains to a surfacing unit, tile or panel of fibrous material particularly usable for surfacing walls, ceilings or the like, the surfacing unit, tile or panel having thermal insulation properties and acoustic or sound attenuating characteristics. The surfacing unit or panel of the invention is preferably fashioned of glass fibers but may be fashioned of other types of fibers.

Panels or tiles have heretofore been fashioned of glass fibers wherein a mat of glass fibers is compressed to a desired thickness and density to provide a substantially rigid board-like product of uniform thickness and the board-like body severed to provide tiles of square or rectangular configuration. Square or rectangular panels or tiles of this character are adhered to a support by an adhesive. In the application of tiles or panels of this character, there is no means or method of attaining exact or accurate alignment of the panels or tiles in assembly other than by visual observation. Hence the installation of tiles or panels of this character require considerable skill on the part of the workmen. Furthermore, by reason of the operation of severing the fibrous board to square or rectangular configurations, variations occur which foster misalignment in installation. Glass fiber panels or tiles have been fashioned with tabs extending from the four edges arranged for overlapping relation with edge regions of adjacent tiles but such tab arrangements do not provide a means for aligning the tiles and reliance is had upon the abutting engagement of adjacent edges of tiles in endeavoring to secure an aligned orientation.

An example of tiles of this character is disclosed in Johnston U.S. Pat. 3,077,426. Panels or tiles have been fashioned with edges of tongue and grooved character but such tiles do not provide for alignment in assembly in both directions. Rigid fibrous tiles of substantially uniform thickness do not have high strength structural edge configurations resistant to damage in handling and shipping.

The present invention embraces a method of forming a fibrous surfacing unit, panel or tile by molding wherein the edge configuration is shaped and of high density to provide substantially rigid edges having high strength characteristics resistant to warpage and damage in handling.

An object of the invention resides in a method of fashioning a fibrous surfacing unit or panel by molding whereing in a comparatively thick mat or body of fibers of substantially uniform thickness, such as glass fibers, is compressed to one density in a central region and compressed to a higher density at the edge regions in the molding operation, the mat of fibers containing a binder which is cured or set during molding to insure a permanent configuration of the surfacing unit or panel.

Another object of the invention is the provision of a fibrous surfacing unit or panel having a comparatively thin central region of compressed glass fibers integrated by a cured binder and fashioned with certain edge regions of high density provided with projections and other edge regions of high density fashioned to provide for overlapping engagement with projections on adjacent units or panels whereby the units or panels, when being installed, are automatically aligned in both directions, enabling installation and assembly by unskilled labor.

Another object of the invention is the provision of a fibrous surfacing unit or panel of comparatively high density having edge regions of increased density providing high strength characteristics and which is shaped to facilitate rapid and efficient installation in coplanar relation with adjacent units or panels without the use of special tools.

Another object of the invention embraces a method of fashioning a surfacing unit, tile or panel of glass fibers and binder wherein the obverse surface area may be provided with a decorative or roughened surface, repetitive in each unit, tile or panel, presenting a symmetrical surface decor in installed assembly.

Another object of the invention resides in the provision of a surfacing unit, tile or panel of compressed glass or other fibers bonded in compressed condition with a resinous film mechanically joined or adhered to the obverse surface of the unit, tile or panel providing a durable surface that may be readily cleaned without impairing the acoustic properties or thermal insulating characteristics.

Another object of the invention resides in a method of and means for molding a surfacing unit or panel of glass fibers and binder wherein the edge regions are fashioned of fibers compressed to a high density and wherein the central region defined by the high density edge regions may be fashioned of different densities and thicknesses to vary or modify the sound attenuating or acoustic properties as well as the thermal insulating characteristics of the unit or panel without modifying the overall height or thickness thereof.

Another object of the invention resides in a fibrous surfacing unit or tile fashioned of binder impregnated compressed fibers wherein the edge regions may be of greater height than the thickness or height of the central section defined by the edge regions providing an air space between the central section and a support means enhancing the insulating characteristics of the wall or ceiling surfaced with the units or tiles.

Another object of the invention resides in a fibrous surfacing unit or tile fashioned of compressed glass fibers be of various shapes and painted or decorated to enhance the decor of a room.

Another object of the invention is the provision of a surfacing unit of tile fashioned of compressed glass fibers and binder with high density, high strength edge regions of a shape wherein the units or tiles are of comparatively light weight and which may be readily nested to occupy a small space for shipping and handling with a minimum liability of damage.

Another object of the invention is the provision of a molded fibrous surfacing unit or panel fashioned with edge regions having high strength characteristics which are highly resistant to warping.

Another object of the invention is the provision of a surface unit, panel or tile fashioned of mineral fibers such as glass fibers rendering the product fire resistant and noise absorbing.

Another object of the invention resides in the provision of molded fibrous surfacing units or panels whereby, in assembly, the panels are self-aligning and may be stapled or nailed to a support means requiring a minimum number of staples, or the units or panels anchored to or suspended from a support means by suitable fastening devices or an adhesive.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a top plan view of a fibrous surfacing unit, panel or tile of the invention;

FIG. 2 is a bottom plan view of the surfacing unit illustrated in FIG. 1;

FIG. 3 is an elevational view of one edge region of the surfacing unit shown in FIG. 1;

FIG. 4 is an elevational view of another edge region of the surfacing unit shown in FIG. 1;

FIG. 5 is an enlarged fragmentary isometric view taken substantially on the line 5—5 of FIG. 2;

FIG. 6 is an enlarged fragmentary sectional view taken substantially on the line 6—6 of FIG. 2;

FIG. 7 is a view similar to FIG. 5 illustrating a modification of an edge region of the surfacing unit;

FIG. 8 is a sectional view illustrating the surfacing units in assembled relation on a support means;

FIG. 9 is a plan view illustrating fragmentary portions of several of the surfacing units in juxtaposed orientation for assembly;

FIG. 10 is a fragmentary sectional view taken substantially on the line 10—10 of FIG. 9;

FIG. 11 is a sectional view similar to FIG. 10 illustrating the adjacent surfacing units in assembled relation;

FIG. 12 is an elevational view taken substantially on the line 12—12 of FIG. 9;

FIG. 13 is a detailed sectional view taken substantially on the line 13—13 of FIG. 9;

FIG. 14 is a plan view showing fragmentary portions of four surfacing units illustrating their interengaging relation in assembly;

FIG. 15 is an elevational view of portions of surfacing units in nested arrangement;

FIG. 16 is a sectional view of surfacing units in nested relation;

FIG. 17 is a fragmentary sectional view illustrating a method of forming a surfacing unit of the invention;

FIG. 18 is a fragmentary sectional view illustrating a surfacing unit wherein the central region is of increased thickness;

FIG. 19 is a fragmentary sectional view illustrating a surfacing unit having a roughened obverse surface configuration;

FIG. 20 is a fragmentary sectional view illustrating a surfacing unit with reciprocal surface orientation on the major surfaces;

FIG. 20a is a sectional view similar to FIG. 20 illustrating the obverse planar surface of a unit having spaced recesses therein;

FIG. 21 is a fragmentary sectional view similar to FIG. 20 illustrating a laminated facing or film on the obverse surface of a unit;

FIG. 22 is a sectional view illustrating a method of securing surfacing units to a support means;

FIG. 23 is an elevational view of an edge region of a panel illustrating angularities of the edges;

FIG. 27 is a fragmentary sectional view illustrating a modified form of surfacing unit of the invention.

Figure 24:
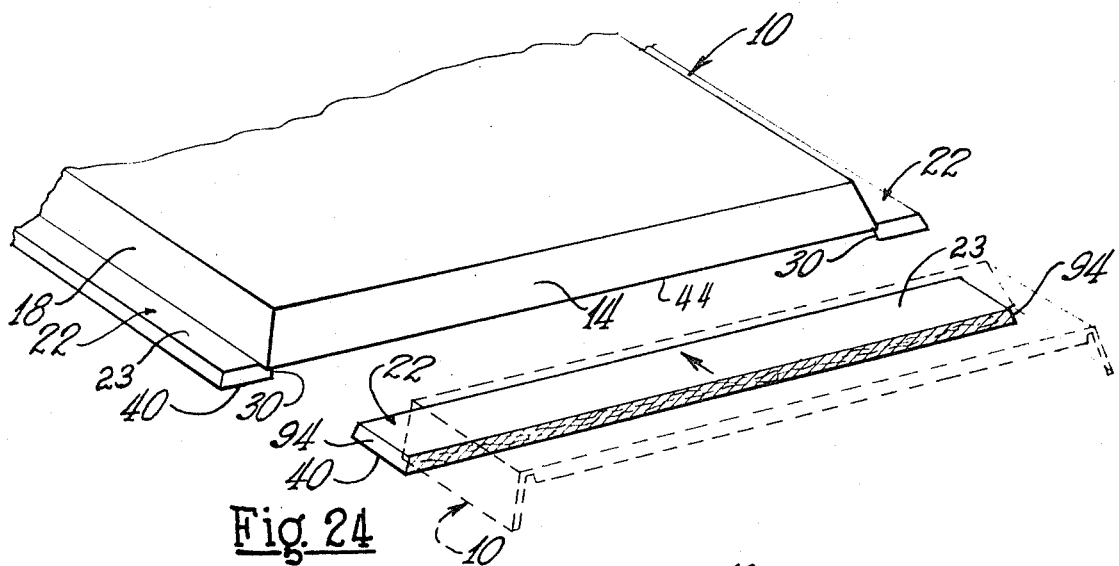
FIG. 24 is an isometric view of adjacent portions of two surfacing units illustrating the method of attaining alignment of the units.

While the preferred form of surfacing unit, panel or acoustic tile of the invention is fashioned of glass fibers and binder, it is to be understood that other types of fibers may be used in fabricating the surfacing units, panels or tiles of the character shown and described herein.

As hereinafter more fully described, the method for producing the surfacing unit, panel or tile involves a body or mass of glass fibers provided or impregnated with a suitable binder and the body or mass compressed between molding dies to form a surfacing unit, panel or tile of desired shape, contour and thickness and the binder cured or set while the body of fibers is in compressed condition.

Referring to the drawings in detail and initially to FIGS. 1 through 6, FIG. 1 illustrates a plan view of the obverse face of the surfacing unit, panel or tile 10 of the invention, and FIG. 2 is a plan view of the rear face or surface of the construction. The finished surfacing unit, panel or tile 10, as shown in FIGS. 1 and 2, is of square configuration and preferably of standard tile dimensions, such as twelve inches square or sixteen inches square, or the product may be rectangular. Where the tile is of rectangular shape, the length of the major surface should be twice the width of the major surface to obtain the advantages of the self-aligning characteristics in assembly hereinafter described.

The surfacing unit, panel or tile embraces a central portion or section 12 comprising a body of glass fibers or other fibers compressed to a desired density and thickness. The unit is fashioned with a pair of oppositely disposed edges or edge regions 14 of the fibers compressed to a greater density than the fibers at the central region 12 and hence of lesser thickness than the central region, as shown in FIG. 6.

The other pair of oppositely disposed edge configurations of the tile are illustrated at 18 and are similar in shape to the edge regions 14, the fibers in the edges or edge regions 18 being compressed to substantially the same density and thickness as the fibers in the edge regions 14. The edge regions 18 are provided with integral projections, extensions or tabs 22, the fibers in the tabs or projections 22 being compressed but preferably not to the extent of compression of the fibers in the edge regions 18. The edge regions 18 are integrally joined with the central portion or section 12 by bridge portions 24, and the edges or edge regions 14 integrally joined with the central portion or section 12 by bridge portions 26.

In the surfacing unit shown in FIGS. 5 and 6, the bridge portions 24 and 26 of fibers are of different thicknesses and densities for purposes hereinafter explained. The central section or portion 12 is defined by angular surfaces 28 at the four edges of the central section or portion 12, and the inner surfaces 30 of the edge regions 18 and the inner surfaces 32 of the edges 14 are arranged at angles in converging relation with the angularity of the surfaces 28, the respective pairs of converging surfaces forming pairs of channels or grooves 36 and 38.

The pairs of surfaces defining the grooves 36 and 38 are arranged in converging relation to facilitate the molding operation in forming the surfacing unit or panel and to assure a better flow orientation of the fibers in the bridge portions 24 and 26 and the edge regions 14 and 18.

The planar surface 40 of each of the projections or tabs 22 is adapted to engage support means such as furring strips, ceiling suspension devices, or wall or ceiling surfaces to be covered by the units, panels or tiles 10 in assembled relation. The obverse or decorative surface 42 of the central section 12 of each unit 10 is substantially planar in shape and the overall thickness or height of each unit or panel is indicated at A in FIG. 6.

The units, panels or tiles to be assembled on a wall or ceiling are of identical overall height at the edge regions indicated at A in FIG. 6 so that the finished or obverse surfaces 42, when of planar character in assembly are disposed in a common plane. The thickness of each tab, extension or projection 22 is indicated at B in FIG. 5. The terminal edge 44 of each of the edges or edge regions 14 terminates at a distance from the tab surface 40 indicated at C, the terminal edges 44 lying substantially in the plane of the surfaces 23 of the tabs 22. However, it may be preferable, as a production expediency, that the distance C be slightly more than the thickness B of a projection 22, for example, five thousandths of an inch to provide minute clearance to slidably accommodate an adjacent projection 22 in assembly, in overlapping relation with a terminal edge 44 of an edge region 14 of a unit, this overlapping relation being illustrated in FIGS. 8, 11 and 14.

The exterior surface 46 of each of the edge regions 18 and the exterior surface 48 of the edge regions 14 in assembly, as shown in FIGS. 8, 11 and 14, provide a V-shaped rectilinear groove or channel 50 which is automatically aligned with grooves 50 provided by assembly of adjacent units or panels presenting the appearance of parallel continuous linear grooves in both directions over the area surfaced by the assemblage of panels.

The panels are self-leveling in that each projection 22 is overlapped by the terminal edge 44 of an edge region 14 of an adjacent panel. The surface 46 of each edge region 18 and surface 48 of each edge region 14 are of the same angularity with respect to the obverse surface 42 of the unit or panel so that the grooves 50 are defined by angular surfaces of equal and opposite angularities as shown in FIG. 11.

The pairs of edges 14 and 18 together surround or embrace the central section 12, and by reason of their angular relationship, they provide a flared, skirt-like configuration of perimeter for the surfacing unit, panel or tile. In FIG. 23, the angularity of the surface of an edge region 14 of a unit or panel with respect to a plane normal to the surface 42 is indicated at E. It is found that an angle of approximately fifteen degrees, which in association with the same angularity of the edge 18 on an adjacent tile, provides an included angle of about 30 degrees which presents an attractive aesthetic design in assembly. The angularity also provides draft for the molding operation in forming a unit.

It is found that where the angularities of the edges are increased substantially, the visual linearity is not as distinctive. Where the units or tiles are employed for ceiling surfaces, the increased angles tend to reflect light, impairing the appearance and which may be distracting to the occupants of the room. The tabs, projections or strips 22 provide means to accommodate staples or nails for securing the units or tiles to a support means.

FIG. 8 illustrates one method of supporting the panels or tiles from furring strips of a wall or ceiling construction. Joists or studding are indicated at 54 to which are secured furring strips 56 by nailing or other means, this construction being one form of support means for the panels or tiles. The units, panels or tiles 10 are illustrated in assembled relation and are secured in assembled relation to the furring strips by nails or staples 58 driven through the tabs 22, the tabs being covered or obscured from view by the overlapping edge regions 14 of adjacent tiles, as illustrated in FIGS. 8 and 14. In lieu of nailing or stapling the tiles or a support means, the planar surfaces 40 of the tabs or projections 22 may be coated with adhesive and the tiles or panels secured to the furring strips or other support means by the adhesive. The units or tiles may be suspended from support means by other suitable fastening devices.

FIGS. 9, 10, 12 and 13 show the relative positions of several of the units, panels or tiles in adjacent relation to illustrate the method of assembly in surfacing an area. FIG. 14 illustrates portions of four units, panels or tiles in assembled relation. With particular reference to FIG. 9, the tab or tacking strip 22 of tile 10 is stapled or secured to a support means. The edge region 14 of the tile or panel 10a is moved in a left-hand direction to overlap the adjacent tab 22 on the tile 10.

Tile 10b is moved toward tile 10 so that the adjacent tab 22 on the tile 10b extends under the adjacent edge 14 of tile 10. Tile 10c is moved toward tiles 10b and 10a whereby the tab 22 on tile 10c extends under the edge 14 of tile 10b, and the edge 14 of tile 10c extends over the adjacent tab 22 of the tile 10a.

Tile 10d is moved toward tile 10 whereby the tab 22 on tile 10d is disposed under the adjacent edge 14 of the tile 10. Tile 10e is moved toward tiles 10a and 10d to dispose tab 22 on tile 10e beneath and in overlapping relation with the adjacent edge 14 of the tile 10d, and the edge 14 of tile 10e extending over the adjacent tab 22 on tile 10a. This method of assembly is carried out with any number of tiles.

Where nails or staples 56 are utilized for securing the tiles to a support means, alternately disposed tiles may be stapled or nailed to the support means through one or both tabs 22 on a tile, and one tab of each intermediate tile is stapled or nailed to the support means. Through this method and arrangement of assembling the tiles, edges 14 provide support for the tiles which are not stapled through both tabs.

While the obverse surfaces 42 of the units, panels or tiles are preferably of planar shape, it is to be understood that they may be slightly convex or concave or of other modified shape if desired, but the peripheral edges or boundaries defining the surfaces 42 are of uniform height, indicated at A in FIG. 6, from the surfaces 40 of the tabs 22 so that such peripheral edges of surfaces 42, in assembly, are disposed in a common plane.

FIG. 10 illustrates in cross section the relative positions of tiles 10b and 10c prior to engaging tile 10c in assembled relation with tile 10b where the tab 22 is to be overlapped with an edge 14 on tile 10b. FIG. 12 illustrates the relative positions of tiles 10d and 10e preparatory to their assembly. FIG. 13 illustrates in cross section the relative positions of tiles 10a and 10e preparatory to their assembly wherein edge 14 of tile 10e is to be moved into overlapping relation with the adjacent tab 22 on the tile 10a.

FIG. 14 illustrates the completed assemblage of interengaging or overlapping portions of tiles or panels 10, 10a, 10b and 10c whereby the tiles are self-aligning in both directions as hereinafter explained, which assemblage provides visual continuity of the linear grooves 50 through the aligned relation of the tiles.

It has been found that an overall height of a surfacing unit, tile or panel indicated at A in FIG. 6, this being the dimension between the plane of the surface 40 of a tab or projection 22 and the plane of the peripheral edges of the obverse surface or face 42 of a unit, tile or panel, should preferably be about three-eighths of an inch, but may be of a greater or lesser height depending upon the thermal and acoustic characteristics desired for the product. In molding the tile or panel, the fibers of the central or major section or body portion 12 providing the obverse surface 42 may be compressed to different thicknesses and densities and thereby modify the thermal and acoustic characteristics of the product.

The method of molding the fibrous tile or panel is adaptable for compressing the mass or body of glass fibers or other fibers to different densities in various portions or regions of the tile or panel to obtain certain physical and structural characteristics. FIG. 17 illustrates semischematically the method of forming or molding the panel or tile. The molding apparatus includes a bottom die or platen 64 and an upper die or platen 66, the dies being mounted in a conventional press for relative movement toward and away from each other. The dies or platens 64 and 66 are preferably heated by electrically energizable heating means 68, but they may be heated by fluids such as heated air circulated through passages in the dies or by other means.

With the dies in open position, as shown in FIG. 17, a loose mass or pelt 70 of glass fibers or other suitable fibers impregnated with a heat-curable or settable binder is disposed between the dies as illustrated in FIG. 17. In the molding of a panel or tile of an overall height, indicated at A in FIG. 6, of about three-eighths of an inch, the fibrous mass or pelt 70 is initially of a thickness of about two inches of loose randomly-oriented fibers as they are delivered from a conventional glass fiber-forming apparatus onto a conveyor.

The glass fibers may be formed by the method and apparatus disclosed in Slayter et al. Pat. No. 3,026,563, or by other conventional fiber-forming processes. Fibers or various diameters may be employed providing the fibers are flexible. It has been found that glass fibers of an average or size of about .00028 inch are preferred, but fibers of lesser or greater diameters may be employed. Fibers of increased diameters tend to impair the fidelity of design. The fibers may be of varying lengths, for example in a length range of from one half inch to eight inches or more, or continuous fibers or filaments may also be used.

The fibrous mass 70 is impregnated or provided with a suitable uncured binder such as phenolformaldehyde or other binder suitable to retain the fibers permanently in molded configuration, the binder being usually applied as the fibers are formed. The mass or uncompressed body or pelt of fibers 70 is of very light density, being about one pound per cubic foot and is of substantially uniform thickness enabling the use of a conventional mat of fibers from a fiber-forming station to effect economical production of tiles or panels even though the fibers are compressed in the molding operation to different densities and thicknesses in various regions in forming the tiles or panels.

The obverse surface or face of the panel or tile may be provided with a layer of facing of resinous film such as a vinyl film (copolymer of vinyl chloride and vinyl acetate) or other plastic film.

Thus where it is desired to face the panel or tile with film, a vinyl film or other plastic film 72 is disposed on the loose fibrous mass 70 in the manner illustrated in FIG. 17. The mass of fibers may be molded to tile or panel configuration without a resinous film or facing layer. The upper or female die or platen 66 is fashioned with a surface 76 bounded by four angularly-arranged surfaces 78, one of which is shown in FIG. 17. Two of the opposed angular surfaces 78 are in converging relation with a surface 80, and each of the surfaces 80 intersected by an angularly-arranged surface 82 terminating in a sharp edge 83 which trims the tile to size when the dies are closed.

The lower or male die 64 is fashioned with an upper surface 84 bounded by an upwardly extending peripheral ridge 86 of square contour. The exterior surface 88 of the ridge intersects a surface 90 parallel with the surface 84. When the dies or platens are in closed or fiber-compressing relation to form the unit, tile or panel of the shape shown in FIGS. 3 and 6, the surface 76 of the upper die forms the obverse surface 42 of the tile or panel while the surface 84 forms the lower surface of the central compressed fiber section 12.

The surfaces 78 of the upper dies form the exterior surfaces 46 of the edge regions 14 and 18 while the surfaces 88 of teh lower die form the interior surfaces 30 and 32 of the edge regions 14 and 18.

The surface 80 of the upper die and the surface 90 of the lower die define the upper and lower surfaces of the tabs or projections 22, the surface 82 on the upper die defining the edges of the projections 22. The panels or tiles may be formed by this method either with or without the resinous film layer 72.

The film may be in a range of from one to eight mils in thickness and is preferably of a thickness of about four mils. In curing a tile with or without a vinyl facing 72, the fibrous mass 70, lying on the lower die, is heated substantially before the dies are brought to closed position. This action results in differential temperatures between the upper and lower regions of the tile causing warpage. In order to avoid uneven heating and warping the upper die is maintained at a higher temperature than the lower die so as to more nearly equalize the heating of upper and lower sections of the tile and thereby prevent warpage.

In carrying out the method in fashioning tiles without the film facing or layer 72, the temperature differential is approximately ten degrees. For example, if the upper die is at a temperature of 440° F., the temperature of the lower die would be about 430° F. The average curing time, that is, the time that the dies are held in closed or tile molding position is approximately one minute and thirty seconds for curing tiles without a resinous film facing 72. This curing time is sufficient to set the phenolformaldehyde binder.

In heat curing the binder in tiles or panels having vinyl film facing, lower curing temperatures are employed. For example, in curing a film-faced panel or tile, the upper die may be heated to approximately 375° F. and the lower die maintained at a temperature of about 360° F., providing about a fifteen degree temperature differential between the upper and lower dies. By reason of the reduced temperatures in curing the binder in a film-faced tile or panel, the dies are maintained in closed heat-curing position for about two minutes in order to effect a proper curing or setting of the binder.

It is found that a tile of improved appearance is one wherein the intersection of the obverse surface or face 42 and the exterior surface of the edge region 18 is of a sharp definition, that is, a high fidelity of sharp edge improves the appearance of the tiles when assembled on a ceiling or wall. The character of the edge provided by the intersection of the surfaces 42 and 48 is of high fidelity of sharpness at the region of the bridge portion 26 as the fibers may be readily drawn and compressed in the edge region 14 and at the bridge 26, the angularity of the edge 14 being such that the fibers are not liable to be severed in the molding operation.

With reference to FIGS. 5 and 17, it will be apparent that in forming the tabs 22 integrally connected with the edge regions 18, the fibers are stressed or drawn at the bridge regions 24.

In order to attain a high fidelity of definition or sharpness of the edge 47, the fibers at the bridge regions 24 are compressed to a higher density thereby reducing the thickness of the bridge portion 24 as compared with the bridge portions 26. Thus, a sharply defined edge 47 is attained by highly compressing the fibers in the region of the bridge section 24 to cause the fibers to fill the region at the apex of the surfaces 76 and 78 of the upper die or mold 66, the fibers being compressed at these regions to a density whereby the bridge sections 24 are about half as thick as the bridge sections 26, shown in FIG. 6.

FIG. 7 is illustrative of a unit or tile wherein the fibers at the bridge sections adjacent the edge regions 18 are compressed to a lower density. The central section 12', the edge region 18' and the tab 22' may be of the character illustrated in FIG. 5. In this form, the fibers at the bridge section 24a are compressed to substantially the same density as the fibers at the bridge region 26, shown in FIG. 6. In this form, the edge 47a may not be as sharply delineated or defined as the edge 47 in the construction shown in FIG. 5.

In molding the various forms of the units or tiles, the mass or pelt 70 of fibers is of a thickness and density and the molding pressures are sufficient to assure high fidelity of surface texturization and proper molding without any appreciable crushing of the fibers.

The fibers of the mass or pelt 70 are treated with an amount of binder, such as phenolformaldehyde to attain properties and characteristics desired in the tile or panel.

The amount of binder in the fibrous mass 70 is preferably in the ratio of between three percent and twenty-five percent by weight of the fibrous glass mass, the ratio of binder to the fibrous component being dependent upon the desired thickness and degree of rigidity of the central section 12 of the tile or panel.

The following is exemplary of dimensions and structural characteristics of one form of molded fibrous tile, shown in FIGS. 5 and 6, made according to the method of the invention which is of comparatively light weight having effective thermal insulating properties and sound attenuating characteristics. Where the height of the tile, indicated at A in FIG. 6, is approximately three eighths of an inch, the compressed central section 12 of the tile is about one eighth inch in thickness, the compressed fibers in the central section being of approximately a density of between fourteen and eighteen pounds per cubic foot.

The fibers in the edge regions 14 and 18 and bridge portion 26 are compressed to a higher density of about thirty pounds per cubic foot and are of a thickness of about one sixteenth inch. The fibers at the bridge sections or portions 24 are compressed to a density of about sixty pounds per cubic foot and of a thickness of about one thirty second inch. The tab portions or projections 22 are of a thickness of about one eighth of an inch and the fibers therein compressed to approximately the same density as those in the central section 12.

The highly compressed fibers in the bridge sections 24 provide edges 47 of high fidelity and sharp delineation. The fibers of the central section compressed to the above-mentioned density provide a central section which is substantially rigid, and by reason of the highly compressed fibers in the edge regions 14 and 18, the central section 12 is substantially reinforced by the rigid edge regions and warping of the unit or tile substantially eliminated.

The unit, tile or panel of the character illustrated in FIGS. 1 through 7 has effective acoustic or sound attenuating characteristics even though the central section 12 is of substantial density. The acoustic characteristic or noise reducing property of a body is usually expressed as N.R.C. (noise reduction coefficient). It is found that the noise reduction coefficient of the fibrous section 12 is from .50 to .60 which is indicative of comparatively high acoustic or noise reducing properties. Where the central section 12 is compressed to a lesser density, the acoustic properties may be improved but the rigidity factor of the section is reduced.

FIG. 18 illustrates in cross section a unit, panel or tile of this character. The unit 10f is fashioned with edge regions 14f and 18f, one of each being shown, and tabs, one of which is shown at 22f, projecting from edge regions 18f of the unit. The fibrous central section 12f is of greater thickness and of correspondingly less density than the section 12 shown in FIGS. 5 and 6.

Figure 25:
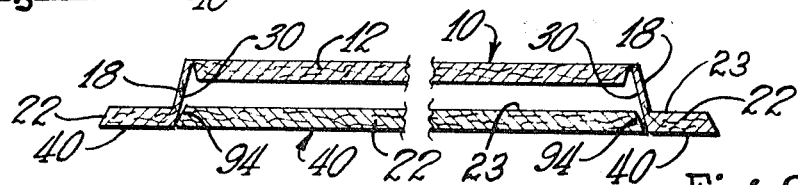
FIG. 25 is a sectional view illustrating the aligning engagement of surfaces of adjacent surfacing units in assembly.

The unit or panel 10f may be preferred where it is desired to attain improved sound attenuating or acoustic properties. The edges or edge regions 14f and 18f provide substantial rigidity to maintain the shape of the unit, tile or panel. The units, panels or tiles are fashioned or configurated to provide for self-alignment or automatic alignment during application thereof in surfacing a wall or ceiling. The structural features providing for alignment are illustrated in FIGS. 23, 24 and 25. The ends or terminals 94 of the tabs or projections 22 are angularly arranged with respect to a plane normal to a tab 22 as indicated at angle F in FIG. 23.

As shown in FIG. 25, the angle of each end of a tab 22 is preferably greater than the interior angle of the surface 30 of an edge region 18, so that the angular portions 94 engage within the inner edge surface 30 whereby the lower surfaces 40 of the tabs 22 lie in a common plane in assembly, with the angular regions 94 on one surfacing unit or tile 10 snugly fitted within the angular surfaces 30 on an adjacent surfacing unit or tile.

Thus, the angular surfaces 94, in engagement with the inner surfaces of the tabs 22 on an adjacent surfacing unit or tile, provide for self-alignment of the surfacing units as they are applied in assembled relation. It has been found that an angle F of about thirty degrees is desirable to effect aligning relation of the apices of angles 94 with the apices provided at the intersection of the surfaces 30 and 40 as shown in FIG. 25. It is to be understood that the angles F at the ends of the tabs 22 may, if desired, be of the same angularity as the angularity of the interior surface 30 of an edge 18 and secure proper aligning relation of the panels or tiles in assembly.

Alignment in the other direction of each of the surfacing units is illustrated in FIGS. 8, 11 and 14 wherein the apex at the terminus of an edge 14 engages the surface 46 of an edge region 18 at the juncture of a tab 22 with its adjacent edge region 18. Through this construction, alignment of the surfacing units, tiles or panels is automatic in that no adjustment or special care is required of a workman in installing the surfacing units. As illustrated in FIG. 14, the surfacing units in assembly provide continuous linearity of the V-shaped grooves 50 throughout an assemblage of the surfacing units.

FIG. 19 illustrates a surfacing unit, tile or panel of the invention wherein the obverse surface 100 is roughened or textured to provide a finish surface of aesthetic and pleasing appearance. The roughened or textured surface is fashioned with protuberances or raised portions 102 defined by recesses 104. The roughened surface is attained by configurating the mold surface 76 with a roughened surface reciprocal to that illustrated in FIG. 19 whereby the roughened surface, while replete with irregularly shaped protuberances and recesses, is a repetitive pattern for the tiles.

FIG. 20 is a sectional view similar to FIG. 19 wherein the rear face of the central section 12h is fashioned with recesses 103 which are reciprocal to the raised portions 102. By molding the central section 12h in the manner shown in FIG. 20, the fibrous body providing the section 12h is of substantially uniform thickness throughout its area.

FIG. 20a is a sectional view illustrating another configuration for the obverse tile surface. In this form, the planar obverse surface 42a of the central section 12i of the tile is molded with spaced recesses, indentations or depressions 107 providing a modified design or decor.

FIG. 21 is illustrative of the surfacing unit, tile or panel shown in FIG. 20 with a film facing or layer 106 on the obverse surface of the unit. The film 106 is laminated or adhered to the body of fibers 70 by the molding operation illustrated in FIG. 17. The film is mechanically bonded or adhered to the surface of the surfacing unit by pressure exerted in compressing the fibers in the molding operation.

FIG. 22 is a sectional view illustrating an assemblage or a support means, such as a wall or ceiling 110, of a plurality of the units or tiles 10 where the tiles are joined by a suitable adhesive to the suport means 110. As shown in FIG. 22, a quantity 112 of adhesive or cementitious material is applied to the rear surface of each tile, as the tiles are assembled, the adhesive 112 securing the tiles to the support means 110. It is to be understood that the adhesive may be employed as the sole means for holding the tile in assembled relation or as a supplementary retaining means where certain of the assembled tiles are secured to the support means by stapling through only one tab.

Figure 26:
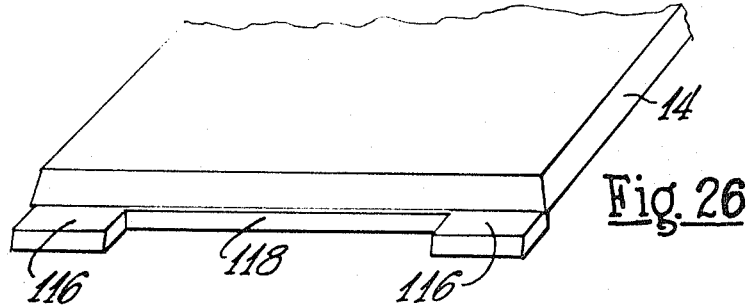
FIG. 26 is an isometric view of a portion of a surfacing unit illustrating a modified edge construction.

FIG. 26 illustrates a modified form of tab construction of surfacing unit, tile or panel. In this form a plurality of projections 116 in spaced relation, as shown in FIG. 26, may be employed in lieu of a full length tab thereby effecting a saving in fibers.

Where tabs of the character shown at 116 are employed, it is preferable for the tabs to be integrally joined by a narrow linear portion 118 so that when adjacent surfacing units, of the character show in FIG. 25, are in assembled relation, the linear section 118 will cover the terminal region of an edge 14 of the adjacent surfacing unit.

FIG. 27 illustrates a modified form of tile construction of the invention fashioned with edge regions of lesser density than the other forms of surfacing unit hereinbefore described. The units shown in FIG. 27 are fashioned of central sections 120 of binder and compressed fibers wherein the fibers are compressed to a desired thickness and the tiles provided with opposite edges having tabs 122 of substantially the same shape as the tabs 22 hereinbefore described.

The obverse edge regions of the surfacing units, shown in FIG. 27, are not of sharp delineation and hence do not provide the high strength edge construction as in the other forms of the invention. The surfacing units of FIG. 27, however, are configurated to provide the tabs 122 received in overlapping relation with adjacent tiles whereby the tiles are self-aligning in the manner hereinbefore described and illustrated in FIG. 25.

The surfacing units, tiles or panels fashioned of a body of binder-impregnated fibers may be painted or coated in any desired manner to match any decor, or the surfacing units may be fashioned with the film facing in the manner hereinbefore described to provide a finish surface integrated in effect with the surfacing unit.

A copolymer vinyl film of four mil thickness has been found to be satisfactory, but surfacing films or layers of other materials may be employed for facing the units, tiles or panels.

While the units, tiles or panels are preferably of an overall heighth of about three eighths of an inch at the boundary or periphery of the obverse surface 42, it is to be understood that the tiles may be of greater or lesser heighth depending upon the acoustic and thermal insulating properties desired or the size or span of the units, tiles or panels.

FIGS. 15 and 16 illustrates the nesting of the surfacing units, tiles or panels for ease in handling and for shipment. The central sections 12 of the tiles 10 are in stacked contiguous relation, as shown in FIG. 16, with adjacent edge regions in nested condition. The tabs 22 are likewise in stacked condition. Thus, the configuration of the units, tiles or panels facilitates compact packaging. The high strength edge regions 14 and 18 are highly resistant to damage during handling and prevent warping of the tiles.

Figure 28:
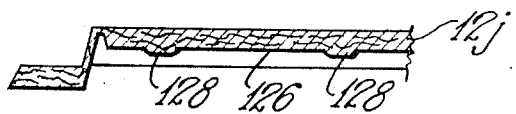
FIG. 28 is a fragmentary sectional view illustrating protuberances on the inner surface of a unit.

FIG. 28 illustrates a form of unit or tile having a modified configuration of the inner or back surface to facilitate nesting of the units or tiles in providing a compact package for handling and shipping. The central section 12j has an inner or back surface 126 provided with a plurality of integral spaced raised portions or protuberances 128 of "button like" configuration extending about one-sixteenth of an inch above the surface 126.

Units or tiles having a back surface with protuberances 128, when stacked or nested for compact packaging as illustrated in FIGS. 15 and 16, are maintained in slightly spaced relation by the protuberances which prevents cramming and a tendency for adjacent units or tiles to become wedged together.

It is apparent that, within the scope of the invention, modifications and different arrangements may be made other than as herein disclosed, and the present disclosure is illustrative merely, the invention comprehending all variations thereof.

We claim:
1. An acoustical panel of compressed mineral fibers having a substantially rectangular central planar section encompassed by rectilinear edge sections extending generally transversely of the central section, said edge sections being of a greater density and lesser thickness than the density and thickness of the central section and of a height greater than the thickness of the central section providing a cavity defined by the edge sections whereby to provide an isolated air space between the central section and an uninterrupted planar support surface when the panel is applied to such surface, and one pair only of opposed edge sections terminating in outwardly extending tabs disposed in substantially parallel relation with the central planar section.

2. A fibrous surfacing unit comprising a body of compressed mineral fibers, a bonding agent interbonding the fibers, said body of fibers having a central section encompassed by rectilinear thin-walled edge sections providing a skirt-like configuration, the fibers comprising the edge sections being compressed to a greater density than the fibers of the central section, a bridge section of compressed fibers extending longitudinally of the central section and longitudinally of the edge sections integrally joining the edge sections with the central section, the edge sections extending generally transversely of the bridge section and central section, the fibers in said bridge section being compressed to a density greater than the density of the fibers in said edge sections.

3. The surfacing unit according to claim 2 wherein alternate edge sections only have tabs of compressed fibers integral therewith extending laterally and outwardly therefrom with their major surfaces in substantially parallel relation, the intermediate edge sections terminating substantially in the plane of the obverse surfaces of the tabs.

4. The surfacing unit according to claim 3 wherein the regions of the bridge section adjacent the edge sections having integral tabs are of higher density than the regions of the bridge section adjacent the intermediate edge sections.

5. The surfacing unit according to claim 3 wherein the central section is of square configuration.

6. A fibrous surfacing unit comprising a body of compressed fibers, a bonding agent interbonding the fibers, said body of fibers having a planar central section encompassed throughout its periphery by connected rectilinear edge sections extending substantially transversely of the central section providing a skirt-like configuration, the fibers of the central section being compressed to provide a substantially rigid central section, the edge sections being of a greater density and lesser thickness than the density and thickness of the central section and of a height greater than the thickness of the central section, a bridge section of compressed fibers extending longitudinally of the central section and longitudinally of the edge sections integrally joining the edge sections with the central section, the fibers in said bridge section being compressed to a density greater than the density of the fibers in the central section.

7. An acoustic tile comprising a body of compressed glass fibers and a bonding agent interbonding the fibers, said tile having a central section of substantially rectangular shape of compressed glass fibers encompassed throughout its periphery by connected rectilinear edge sections extending substantially transversely of the central section providing a skirt-like configuration, the fibers joining the central section with the edge sections being compressed to a higher density than the fibers of the central section, the edge sections being of a greater density and lesser thickness than the density and thickness of the central section and of a height greater than the thickness of the central section, one pair of opposed edge sections terminating in projections of compressed glass fibers extending substantially parallel with and laterally offset from the planar central section, the other pair of opposed edge sections having terminal edges lying substantially in a plane of the surfaces of the projections at the juncture of the adjacent edge sections with the projections.

8. A fibrous surfacing unit comprising a body of compressed glass fibers with a bonding agent interbonding the fibers, the central section of the compressed fibers being of substantially planar rectangular shape encompassed throughout its periphery by connected generally transversely extending thin-walled rectilinear edge sections of compressed glass fibers of a higher density than the fibers in the central section, the edge sections being of a height greater than the thickness of the central section, and a bridge section of glass fibers extending longitudinally of the central section and longitudinally of the edge sections integrally joining the central section with the edge sections throughout the peripheral region of the central section, the fibers of the bridge section being compressed to a higher density than the fibers in the central section whereby the bridge section is of lesser thickness than the thickness of the central region, the alternate edge sections only terminating in integral outwardly projecting tabs of compressed fibers with the major surfaces of the tabs in substantially parallel relation, the intermediate edge sections terminating substantially in the plane of the obverse surfaces of the tabs.

9. A fibrous surfacing unit comprising a body of compressed fibers with a bonding agent interbonding the fibers, the unit having a central section of compressed fibers of substantially planar shape encompassed throughout its periphery by connected rectilinear edge sections of compressed fibers of higher density and of lesser thickness than the density and thickness of the central section, said edge sections extending substantially transversely from the central section and of a height greater than the thickness of the central section, alternate edge sections only terminating in projections extending laterally therefrom and substantially parallel with the central planar section and being integrally joined with said alternate edge sections and offset from the planar central section, the intermediate edge sections terminating substantially in the plane of the obverse surfaces of the projections whereby to accommodate projections of adjacent surfacing units in overlapping relation with the intermediate edge sections in assembly with other surfacing units.

10. The surfacing unit according to claim 9 wherein a bridge section of compressed fibers connects the central section with the edge sections, the fibers of the bridge section being compressed to a higher density than the density of the fibers of the central section and the edge sections, the bridge section being of lesser thickness than the central section and edge sections.

11. The surfacing unit according to claim 9 wherein the end surfaces of each of the projections are angularly arranged with respect to a major lengthwise surface of the projection, each of the projections being of a length to be received in overlapping relation with an intermediate edge section of an adjacent surfacing unit with the angular end surfaces of the projections snugly engaging the inner surfaces of adjacent projections.

12. A surfacing unit comprising a body of compressed glass fibers with a bonding agent interbonding the fibers, said body having a central section of substantially planar configuration of compressed glass fibers encompassed by edge sections defining a substantially rectangular surfacing unit, said edge sections being of compressed fibers of a higher density than the central region, a bridge section of fibers at the perimeter of the central section extending longitudinally of the central section joining the edge regions with the central section, the fibers of the bridge region being compressed to a higher density than the fibers of the central section to define sharp edges of high fidelity at the perimeter of the central section, said edge sections extending generally transversely of the bridge and central sections, opposite edge sections of the unit terminating in projections of compressed fibers laterally offset from the planar central section and extending substantially parallel thereto, the intermediate edge sections terminating in edges lying substantially in a plane of the major surfaces of the projections at the juncture of the adjacent edge sections therewith, the projections being of a thickness to be received in overlapping relation with intermediate edge sections of adjacent surfacing units and of a length to be snugly received between the interior surfaces of projections on an adjacent surfacing unit to provide for alignment of surfacing units in assembled relation, said projections being adapted to be secured to a support means.

13. A nestable surfacing panel comprising a body of interbonded compressed mineral fibers having a substantially rectangular central section encompassed throughout its periphery by connected rectilinear edge sections extending generally transversely of the central section and of a height greater than the central section to accommodate in nesting relation the central section and edge sections of a similar panel when superposed on such similar panel, one pair only of opposed edge sections terminating in outwardly-extending rectilinear tabs offset from the planar central section, the edge sections of said surfacing panel being of higher density and hardness than the central section and of lesser thickness than the central section, said outwardly extending tabs being in contiguous stacked relation in a nested stack of the panels.

14. A fibrous surfacing unit comprising a body of compressed mineral fibers, a bonding agent interbonding the fibers, said body of fibers having a central section encompassed throughout its periphery by rectilinear thin-walled edge sections providing a skirt-like configuration, the fibers comprising the edge sections being compressed to a greater density than the fibers of the central section, a bridge section of compressed fibers extending longitudinally of the central section and longitudinally of the edge sections integrally joining the edge sections with the central section, the edge sections extending generally transversely of the bridge section and central section, the fibers in said bridge section being compressed to a density greater than the density of the fibers in said central section.

References Cited
UNITED STATES PATENTS 3,077,426    2/1963    Johnston _____ 181—33.1
3,092,203    6/1963    Slayter _____ 52—144

JOHN E. MURTAGH, Primary Examiner

U.S. Cl. X.R.

52—144, 588